United States Patent
Mori et al.

(10) Patent No.: US 9,342,637 B2
(45) Date of Patent: May 17, 2016

(54) CONSUMED POWER ESTIMATION DEVICE, ELECTRONIC DEVICE, CONSUMED POWER ESTIMATION METHOD AND RECORDING MEDIUM

(75) Inventors: Masashi Mori, Chiyoda-ku (JP); Hiroaki Sakai, Chiyoda-ku (JP); Yoshinari Sugegaya, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 874 days.

(21) Appl. No.: 13/617,517

(22) Filed: Sep. 14, 2012

(65) Prior Publication Data

US 2013/0311148 A1  Nov. 21, 2013

(30) Foreign Application Priority Data

May 17, 2012 (JP) .................................. 2012-113678

(51) Int. Cl.
*G06F 7/60* (2006.01)
*G06F 17/50* (2006.01)

(52) U.S. Cl.
CPC ........ *G06F 17/5022* (2013.01); *G06F 2217/78* (2013.01)

(58) Field of Classification Search
None
See application file for complete search history.

(56) References Cited

U.S. PATENT DOCUMENTS 6,096,089 A * 8/2000 Kageshima ..................... 703/18
6,205,555 B1    3/2001 Kageshima et al.

FOREIGN PATENT DOCUMENTS

| EP | 1351148 A2 | 10/2003 |
|---|---|---|
| JP | 11-232147 A | 8/1999 |
| JP | 2003-345472 A | 12/2003 |
| JP | 2006-178785 A | 7/2006 |

* cited by examiner

*Primary Examiner* — Omar Fernandez Rivas
*Assistant Examiner* — Herng-Der Day
(74) *Attorney, Agent, or Firm* — Buchanan Ingersoll & Rooney PC

(57) ABSTRACT

A performance value DB stores multiple states of parts comprising a system, and the consumed power of parts in those states. In addition, a condition DB stores conditions when the states of the parts change. A calculator generates state sequences in which the states are arrayed in the order of change in accordance with conditions stored in the condition DB, when information indicating the states of the parts is not communicated. The calculator computes the percentage of the time the parts are in each state per unit time for each state comprising this state sequence. Furthermore, the calculator finds the products of the computed ratios and the consumed power stored in the performance value DB for each state comprising the state sequence, and estimates the sum of the products found as the consumed power of the part.

13 Claims, 19 Drawing Sheets

FIG.10

| STATE SEQUENCE OF FIRST PART GENERATED BY STATE SEQUENCE GENERATION PROCESS | |
|---|---|
| STATE SEQUENCE NO. 1 | STATE ST1A → STATE ST1B → STATE ST1A → STATE ST1B |
| STATE SEQUENCE NO. 2 | STATE ST1C → STATE ST1D → STATE ST1E → STATE ST1F |
| ... | ... |

FIG.12

| STATES COMPRISING STATE SEQUENCE NO. 1 | TYPE OF STATISTICAL QUANTITY | | | | | |
|---|---|---|---|---|---|---|
| | MAXIMUM | MINIMUM | AVERAGE | MEDIAN | MODE | ... |
| STATE ST1A (PARAMETER) | 2.0 mW (NONE) | 1.0 mW (NONE) | 1.5 mW IF STATE ST1A, 5.5 mW IF STATE ST1B (STATE) | 1.6 mW (NONE) | =MEDIAN (MEDIAN) | ... |
| STATE ST1B (PARAMETER) | 6.0 mW (NONE) | 5.0 mW (NONE) | | 5.6 mW (NONE) | =MEDIAN (MEDIAN) | ... |

FIG.14

| RESULTS OF PERFORMANCE VALUE ESTIMATION PROCESS FOR STATE SEQUENCE NO. 1 | | RESULTS OF PERFORMANCE VALUE ESTIMATION PROCESS FOR STATE SEQUENCE NO. 2 | | RESUL... | |
|---|---|---|---|---|---|
| TYPE OF STATISTICAL QUANTITY | PERFORMANCE VALUE [mW] | TYPE OF STATISTICAL QUANTITY | PERFORMANCE VALUE [mW] | STATIST... | |
| MAXIMUM | 4.0 | MAXIMUM | 7.0 | M... | |
| MINIMUM | 3.0 | MINIMUM | 1.0 | MIN... | |
| AVERAGE | 3.5 | AVERAGE | 4.0 | AVER... | |
| MEDIAN | 3.6 | MEDIAN | 3.5 | MED... | |
| MODE | 3.6 | MODE | 5.0 | M... | |

FIG.15

| TYPE OF STATISTICAL QUANTITY | PERFORMANCE VALUE [mW] | OPTIMUM STATE SEQUENCE |
|---|---|---|
| MAXIMUM | 4.0 | NO. 1 |
| MINIMUM | 1.0 | NO. 2 |
| AVERAGE | 3.5 | NO. 1 |
| MEDIAN | 3.5 | NO. 2 |
| MODE | 3.6 | NO. 1 |
| ⋮ | ⋮ | ⋮ |

FIG.16

| TYPE OF STATISTICAL QUANTITY | | MAXIMUM | MINIMUM | AVERAGE | MEDIAN | MODE | ... |
|---|---|---|---|---|---|---|---|
| FIRST PART | PERFORMANCE VALUE [mW] | 4.0 | 1.0 | 3.5 | 3.5 | 3.6 | ... |
| | OPTIMUM STATE SEQUENCE | NO. 1 | NO. 2 | NO. 1 | NO. 2 | NO. 1 | ... |
| SECOND PART | PERFORMANCE VALUE [mW] | 12.0 | 0.2 | 6.1 | 0.8 | 0.8 | ... |
| | OPTIMUM STATE SEQUENCE | NO. 21 | NO. 22 | NO. 22 | NO. 22 | NO. 21 | ... |
| THIRD PART | PERFORMANCE VALUE [mW] | 0.5 | 0.1 | 0.3 | 0.3 | 0.3 | ... |
| | STATE SEQUENCE | NO. 33 | | | | | |
| FOURTH PART | PERFORMANCE VALUE [mW] | 0.3 | 0.1 | 0.2 | 0.2 | 0.2 | ... |
| | STATE SEQUENCE | NO. 44 | | | | | |
| FIRST UNIT | OPTIMUM PERFORMANCE VALUE [mW] | 16.0 | 1.2 | 9.6 | 4.3 | 4.4 | ... |
| SECOND UNIT | PERFORMANCE VALUE [mW] | 0.8 | 0.2 | 0.5 | 0.5 | 0.5 | ... |
| TARGET SYSTEM | OPTIMUM PERFORMANCE VALUE [mW] | 16.8 | 1.4 | 10.1 | 4.8 | 4.9 | ... |

CONSUMED POWER ESTIMATION DEVICE, ELECTRONIC DEVICE, CONSUMED POWER ESTIMATION METHOD AND RECORDING MEDIUM

CROSS-REFERENCE TO RELATED APPLICATION

This application claims the benefit of Japanese Patent Application No. 2012-113678, filed 17 May 2012, the entire disclosure of which is incorporated by reference herein.

FIELD

This application relates generally to a consumed power estimation device, electronic device, consumed power estimation method and recording medium.

BACKGROUND

It is desirable for the consumed power of electronic device and/or the like (hereafter called a "system") as exemplified by a portable terminal to be minimal. Consequently, much technology is being developed to reduce system power consumption. In order to develop this kind of technology, it is necessary to find the power consumption of various parts (hereafter simply called parts) comprising the system.

Normally, it is difficult to directly estimate the power consumption of all parts of a system. Hence, there are times when the maximum value for power consumption listed in data sheets (specifications) of each part combined is used as an estimated value of system power consumption. However, it is rare for each part to constantly maintain a state in which power consumption is equal to the maximum value. Consequently, maximum values and/or the like listed in data sheets are unsuitable as estimated values of power consumption.

In addition, technology has been proposed that would estimate the power consumption of each part without using the maximum value and/or the like listed in a data sheet as the estimated value. With the technology noted in Unexamined Japanese Patent Application Kokai Publication No. H11-232147, the power consumed by a part (command) is estimated by a simulator simulating the actions of the system.

However, in general simulators for simulating system actions do not necessarily simulate the actions of all parts of the system. When the system contains parts whose actions cannot be simulated by the simulator, there are concerns that the technology noted in Unexamined Japanese Patent Application Kokai Publication No. H11-232147 cannot accurately estimate the power consumption of parts comprising the system.

In consideration of the foregoing, it is an object of the present invention to accurately estimate the power consumption of parts comprising a system.

SUMMARY

In order to achieve the above objective, the consumed power estimation device according to the present invention comprises:

a consumed power memory for storing states of parts comprising the system and the consumed power of the parts in these states;

a condition memory for storing conditions when the state of the parts changes;

a generator for generating a state sequence into which the states are arrayed, in the order of change in accordance with the conditions stored in the condition memory;

a ratio computer for computing the percentage of the time when the parts are in the state per unit time, for each state comprising the state sequence; and an estimator for finding the products of the percentages computed by the ratio computer and the consumed power stored in the consumed power memory, for each state comprising the state sequence, and estimating the sum of the products found as the consumed power of the part.

With the present invention, it is possible to accurately estimate the power consumption of parts comprising a system.

BRIEF DESCRIPTION OF THE DRAWINGS

A more complete understanding of this application can be obtained when the following detailed description is considered in conjunction with the following drawings, in which:

FIG. 10 is a drawing showing an example of a state sequence generated by the state sequence generation process;

FIG. 12 is a drawing for explaining the performance value estimation process;

FIG. 14 is a drawing showing results of estimations by the performance value estimation process;

FIG. 15 is a drawing showing extraction results of an optimum state sequence;

FIG. 16 is a drawing showing estimation results of performance values for the target system and parts;

DETAILED DESCRIPTION

Below, the preferred embodiments of the present invention are explained in detail with reference to the drawings.

First Preferred Embodiment

Figure 1:
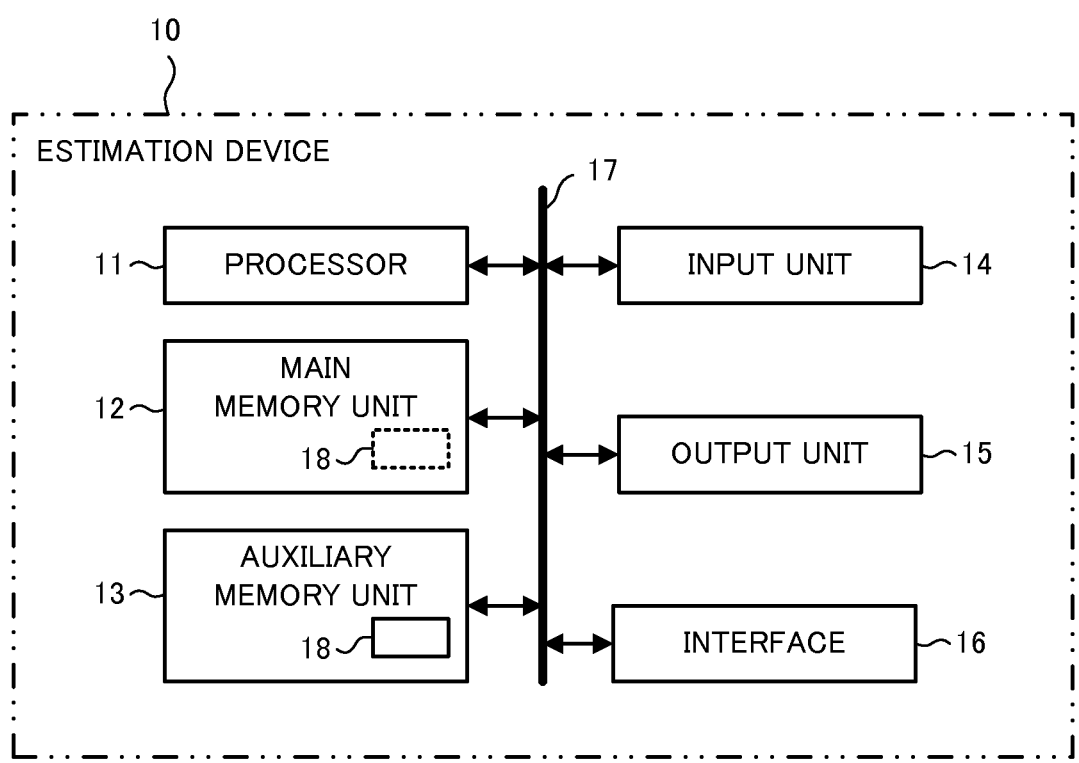
FIG. 1 is a drawing showing the composition of an estimation device according to a first preferred embodiment.

As shown in FIG. 1, an estimation device 10 according to this preferred embodiment comprises a processor 11, a main memory unit 12, an auxiliary memory unit 13, an input unit 14, an output unit 15 and an interface 16. The main memory unit 12, the auxiliary memory unit 13, the input unit 14, the output unit 15 and the interface 16 are all connected to the processor 11 via an internal bus 17.

The processor 11 is composed, for example, of a CPU (Central Processing Unit) and/or the like. The processor 11 executes the below-described processes in accordance with a program 18 stored in the auxiliary memory unit 13. In addition, the main memory unit 12 is composed, for example, of RAM (Random Access Memory) and/or the like. The main memory unit 12 loads the program 18 stored in the auxiliary memory unit 13. Furthermore, the main memory unit 12 is used as a work area for the processor 11.

The auxiliary memory unit 13 is composed, for example, of non-volatile memory such as flash memory, a hard disk and/or the like. The auxiliary memory unit 13 stores the program 18 and various data. For example, the auxiliary memory unit 13 supplies data used by the processor 11 to the processor 11, and stores data supplied from the processor 11, in accordance with instructions from the processor 11.

The input unit 14 is composed of a keyboard and a pointing device such as a mouse, and/or the like. The input unit 14 communicates information input by a user of the estimation device 10 to the processor 11. The output unit 15 is composed, for example, of an LCD (Liquid Crystal Display), a speaker and/or the like. The output unit 15 displays various information to the user of the estimation device 10 in accordance with instructions from the processor 11.

The interface 16 is composed of, for example, a modem or a network terminal device and a LAN (Local Area Network) interface connected thereto, and/or the like. The interface 16 communicates with devices external to the estimation device 10, for example via a network.

The processor 11, the main memory unit 12, the auxiliary memory unit 13, the input unit 14, the output unit 15 and the interface 16 work together and through this the estimation device 10 estimate the performance value of a prescribed system and the parts comprising that system. The prescribed system is, for example, electronic device driven by battery, or an electronic circuit contained in electronic device, an ASIC (Application Specific Integrated Circuit), and/or the like. In addition, in this preferred embodiment, performance means power consumption, and performance value means the magnitude of power consumption.

Figure 2:
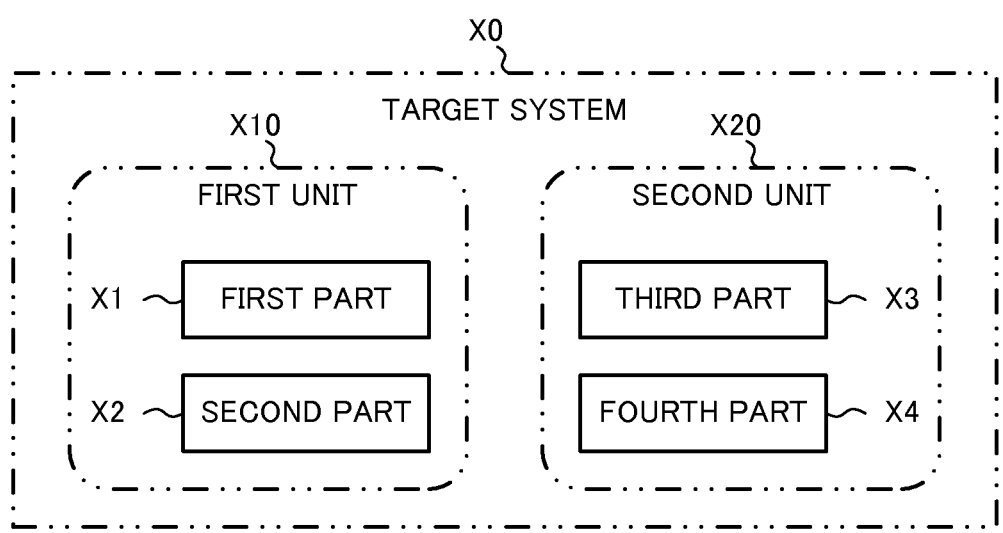
FIG. 2 is a drawing showing the composition of the target system.

Below, the prescribed system that is the target of estimation by the estimation device 10 is called a target system X0. In addition, in order to facilitate understanding of the explanation, the target system X0 shall be one having a simple structure. Specifically, the target system X0 is composed of a first unit X10 containing a first part X1 and a second part X2, and a second unit X20 containing a third part X3 and a fourth part X4, as shown in FIG. 2.

Each of the first part X1 through fourth part X4 is in one of multiple states designed in advance. This state is, for example, a state in which electric power is supplied/interrupted, or a state corresponding to various operating modes. In addition, the state of each of the first part X1 through the fourth part X4 changes to a prescribed state with the passing of time in accordance with the action of the target system X0. A sequence composed of arranged states in accordance with the order of this change is hereafter called a state sequence.

Figure 3:
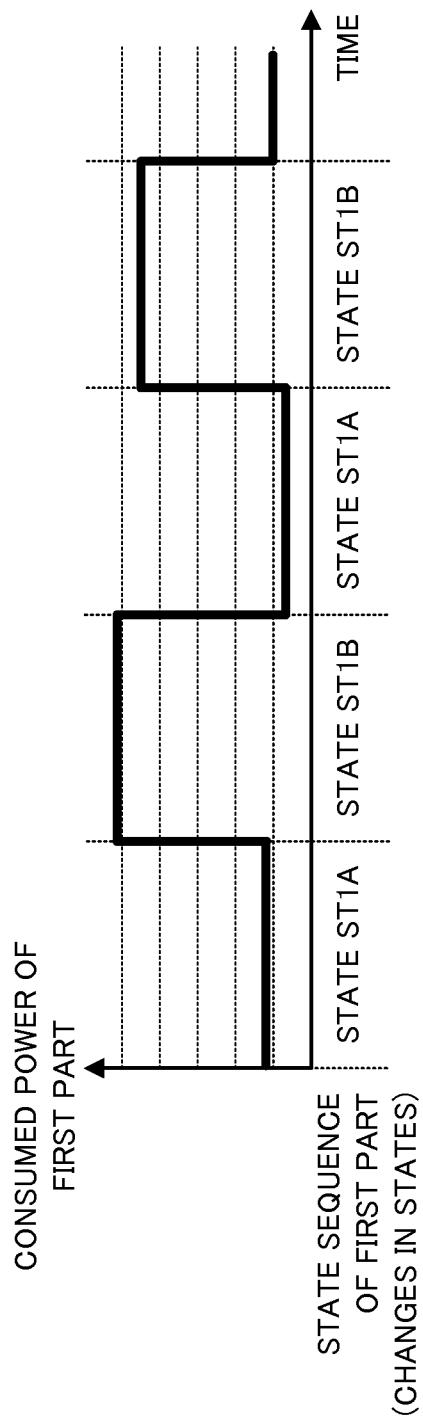
FIG. 3 is a drawing showing the relationship between changes in power consumption and state sequences.

FIG. 3 shows, as one example of the relationship between the state sequence and change in power consumption, the change in power consumption when the first part X1 alternately changes between states St1A and St1B. As shown in FIG. 3, power consumption in the state St1A is roughly a constant value and is less than power consumption in the state St1B. In addition, the power consumption in the state St1B and other states is also roughly a constant value. However, power consumption in each state does not necessarily become strictly a constant. For example, this power consumption could fluctuate due to outside noise.

Figure 4:
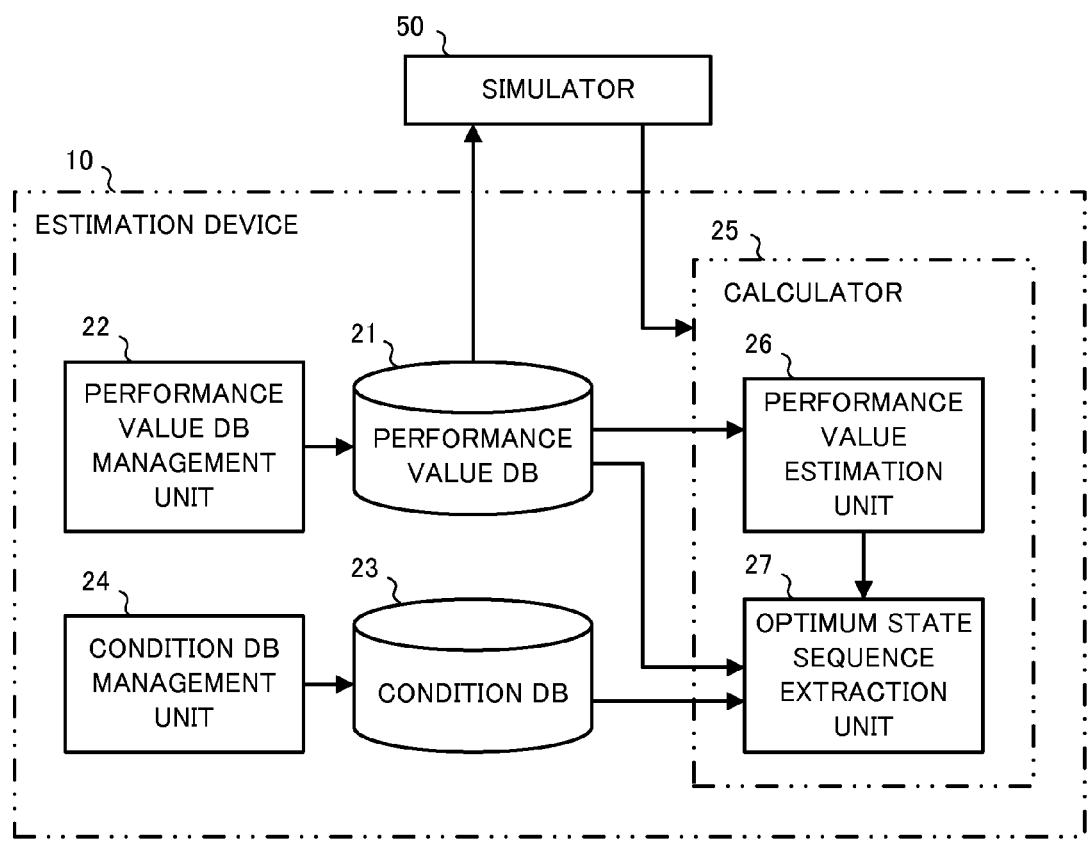
FIG. 4 is a drawing showing functions of the estimation device.

FIG. 4 shows the functions of the estimation device 10. The functions shown in FIG. 4 are realized by the processor 11, the main memory unit 12, the auxiliary memory unit 13, the input unit 14, the output unit 15 and the interface 16 working together. As shown in FIG. 4, the estimation device 10 has a performance value DB 21, a performance value DB management unit 22, a condition DB 23, a condition DB management unit 24 and a calculator 25. The calculator 25 has a performance value estimator 26 and an optimum state sequence extraction unit 27.

Figure 5:
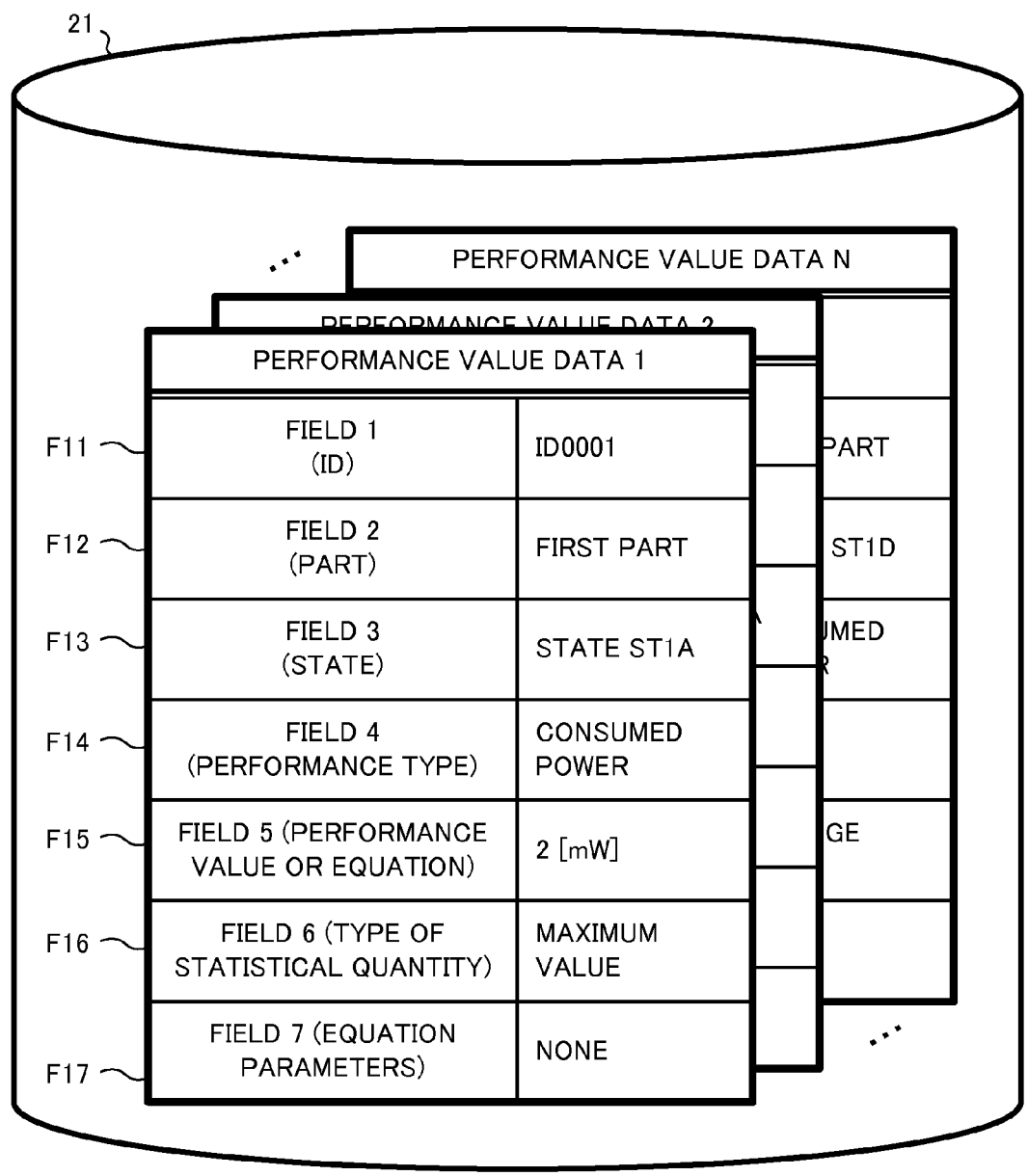
FIG. 5 is a drawing showing performance value data recorded in a performance value DB.

The performance value DB 21 is a database where data related to the performance values of the first part X1 through the fourth part X4 is stored. The performance value DB 21 stores multiple performance value data, as shown in FIG. 5. The performance value data is fixed-length data in table format and has multiple fields.

A field F11 shown in FIG. 5 shows an identifier (ID) for identifying the performance value data. In addition, a field F12 shows a part of the target system X0. In addition, a field F13 shows the state of the part shown in the field F12. In addition, a field F14 shows a type of performance. The field F14 according to this preferred embodiment shows power consumption.

A field F15 shows a performance value of the part in the state shown in the field F13, or an equation for finding this performance value. The performance value is not necessarily strictly a constant value, so the field F15 shows a statistical quantity of the performance value. A field F16 shows the type of this statistical quantity. The type of statistical quantity is, for example, a maximum value, a minimum value, an average value, a medium value or a mode value. In addition, when the field F15 shows an equation, parameters used in this equation are shown in a field F17. The equation is not limited to a numerical equation, for it would be fine for this to be text indicating a computation method for finding the performance value.

For example, the "performance value data 1" shown in FIG. 5 shows that the maximum value of the power consumption of the first part X1 in the state St1A is 2 mW.

Performance value data stored in the performance value DB 21 is prepared in advance by the user of the estimation device 10 using experimental results and data sheets for the first part X1 through the fourth part X4. For example, when notations in data sheets are insufficient, the user of the estimation device 10 creates multiple performance value data items by undertaking numerous measurements in units of states and constituent elements (parts) as small as possible.

In addition, the performance value data of the performance value DB 21 is conveyed to a simulator 50 external to the estimation device 10, as shown in FIG. 4. The simulator 50 conducts simulations of the action of the target system X0 based on the conveyed performance value data. Furthermore, the simulator 50 outputs simulation results to the calculator 25.

The simulator 50 conducts simulations by causing a virtual system Y0 to operate. The virtual system Y0 can be built virtually through software processes of the simulator 50. The virtual system Y0 may be mounted on the simulator 50 using hardware.

Figure 6:
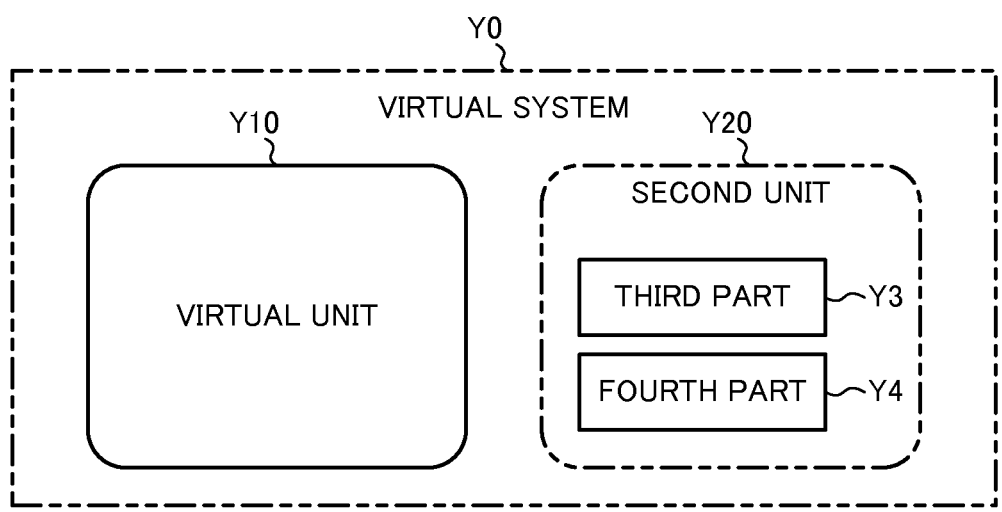
FIG. 6 is a drawing showing the composition of a virtual system.

The virtual system Y0 is composed of a virtual unit Y10 and a second unit Y20 including a third part Y3 and a fourth part Y4, as shown in FIG. 6. The virtual unit Y10 does not simulate the actions of the first part X1 and the second part X2 of the target system X0, but simulates the action of the first unit X10. On the other hand, the third part Y3 simulates the action of the third part X3 and the fourth part Y4 simulates the action of the fourth part X4.

Returning to FIG. 4, the performance value DB management unit 22 has a function equivalent to a so-called database management system. Specifically, the performance value DB management unit 22 manages the performance value DB 21 by correcting and modifying the performance value data stored in the performance value DB 21. For example, when the fourth part X4 is removed from the target system X0, the performance value DB management unit 22 updates the data stored in the performance value DB 21 by deleting performance value data relating to the fourth part X4.

The performance value DB management unit 22 acquires information input by the user of the estimation device 10 by causing a GUI (Graphical User Interface) to be displayed on the output unit 15. In addition, the performance value DB management unit 22 may acquire information from a network via the interface 16, or may acquire information from files stored in the auxiliary memory unit 13. Furthermore, the performance value DB management unit 22 manages the performance value DB 21 based on the acquired information.

Figure 7:
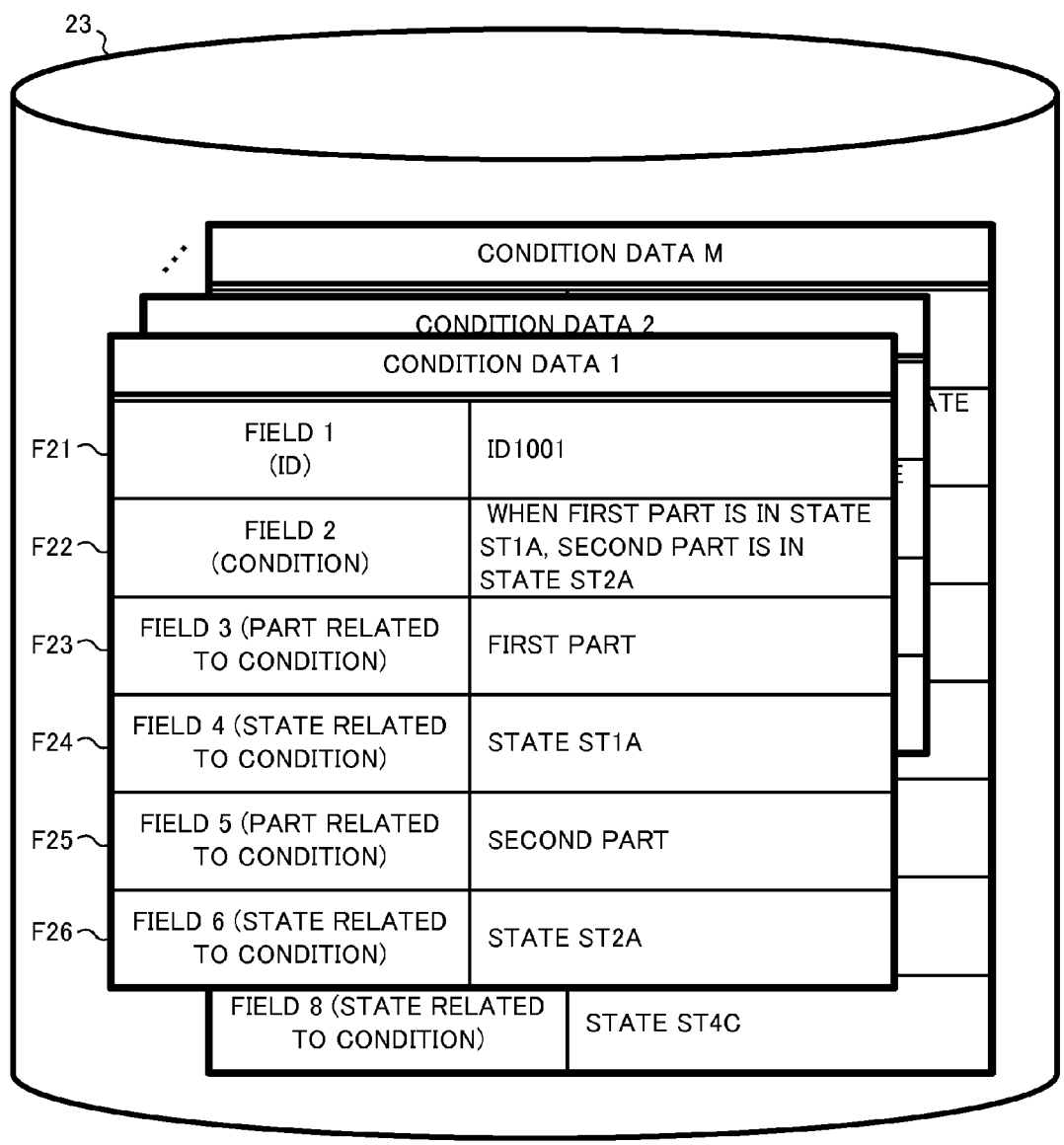
FIG. 7 is a drawing showing condition data recorded in a condition DB.

The condition DB 23 is a database that stores conditions that the respective states of the first part X1 through the fourth part X4 must satisfy. These conditions are, for example, dependency relationships that the multiple states should mutually satisfy, or inclusion relationships, logic relationships (AND/OR), synchronicity, time sequence and/or the like. The condition DB 23 stores the multiple condition data, as shown in FIG. 7. Each item of condition data is variable length data in a table format and has multiple fields.

A field F21 shown in FIG. 7 shows an identifier (ID) for identifying the condition data. In addition a field F22 shows a condition. The condition is defined using groups of parts and states. Parts and states of a first group used in this definition are respectively shown in fields F23 and F24. In addition, parts and states of a second group are respectively shown in fields F25 and F26.

For example, the "condition data 1" shown in FIG. 7 shows a dependency relationship such that when the first part X1 is in a state St1A, the second part X2 takes on a state St2A. The groups of parts and states used in indicating conditions are not limited to two groups and may be one group or may be three or more groups. The condition data stored in the condition DB 23 is prepared in advance by the user of the estimation device 10, similar to the performance value data of the performance value DB 21.

The condition DB management unit 24 has a function similar to that of a so-called database management system. Specifically, the condition DB management unit 24 manages the condition DB 23 by correcting and modifying the condition data stored in the condition DB 23. For example, when a condition that the various parts should satisfy becomes clear, the condition DB management unit 24 adds condition data indicating that condition to the condition DB 23. The condition DB management unit 24 acquires information similar to the performance value DB management unit 22, and manages the condition DB 23 based on the acquired information.

Figure 8:
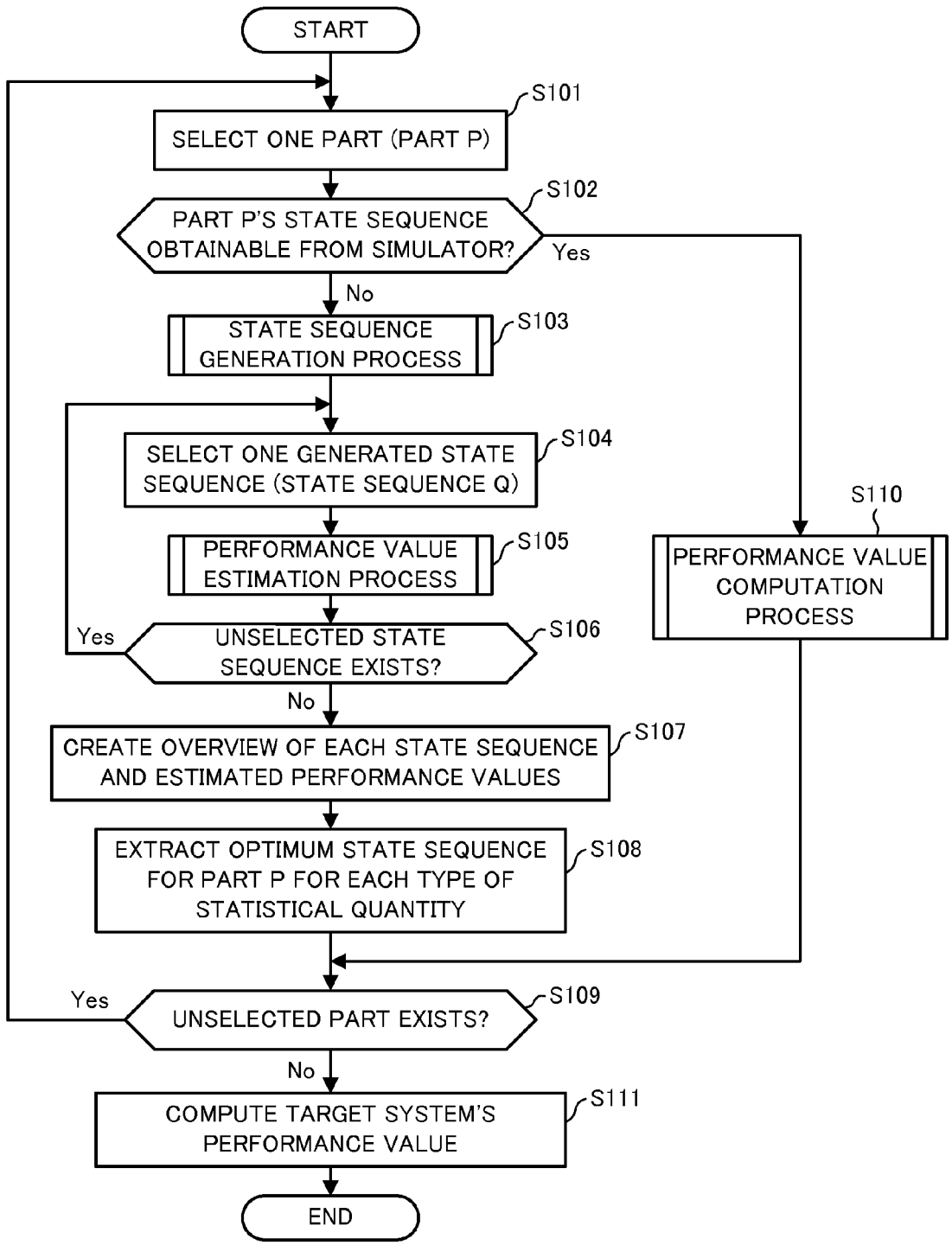
FIG. 8 is a flowchart showing processes executed by a calculator.

The calculator 25 executes various calculation processes based on performance value data, condition data, and simulation results from the simulator 50. For example, the performance value estimator 26 included in the calculator 25 estimates the performance value of the first part X1 and the second part X2. In addition, the optimum state sequence extraction unit 27 included in the calculator 25 extracts the state sequence for optimizing the performance value of the target system X0. Below, the processes executed by the calculator 25 are explained with reference to FIG. 8.

First, the calculator 25 selects one part comprising the target system X0 (step S101). For example, when step S101 is initially executed, the calculator 25 selects the first part X1. The part selected in step S101 is called part P in the explanation below.

Next, the calculator 25 determines whether or not the state sequence of the part P can be acquired from the simulator 50 (step S102). For example, when the part P is the first part X1, the calculator 25 cannot acquire the state sequence of the part P because the action of the first part X1 is not simulated by the simulator 50.

When it is determined that the state sequence cannot be acquired (step S102: No), the calculator 25 executes a state sequence generation process (step S103). The state sequence generation process is a process for generating all of the state sequences with a possibility of being realized as a state sequence of part P.

Figure 9:
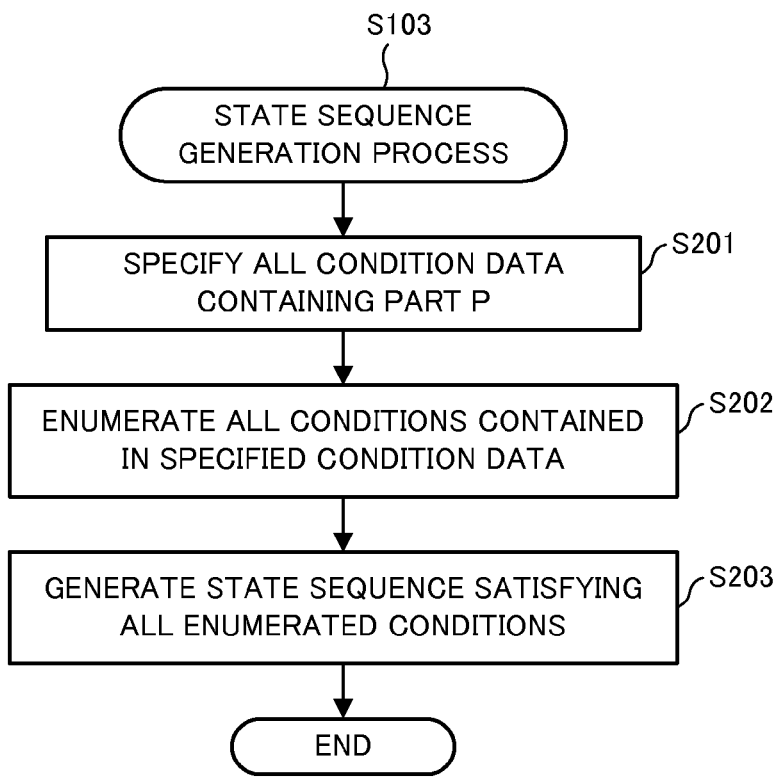
FIG. 9 is a flowchart showing a state sequence generation process.

In the state sequence generation process, as shown in FIG. 9, the calculator 25 first specifies all condition data containing the part P (step S201). Specifically, the calculator 25 specifies all condition data having a field indicating the part P, out of the condition data stored in the condition DB 23.

Next, the calculator 25 enumerates all conditions contained in the specified condition data (step S202). Furthermore, the calculator 25 generates a state sequence satisfying all enumerated conditions (step S203). For example, when the part P is the first part X1, a catalog containing state sequence No. 1, No. 2, and so forth is created, as shown in FIG. 10. Furthermore, the calculator 25 ends the state sequence generation process.

Returning to FIG. 8, following the state sequence generation process, the calculator 25 selects one of the generated state sequences (step S104). The state sequence selected in step S104 is hereafter called state sequence Q.

Figure 11:
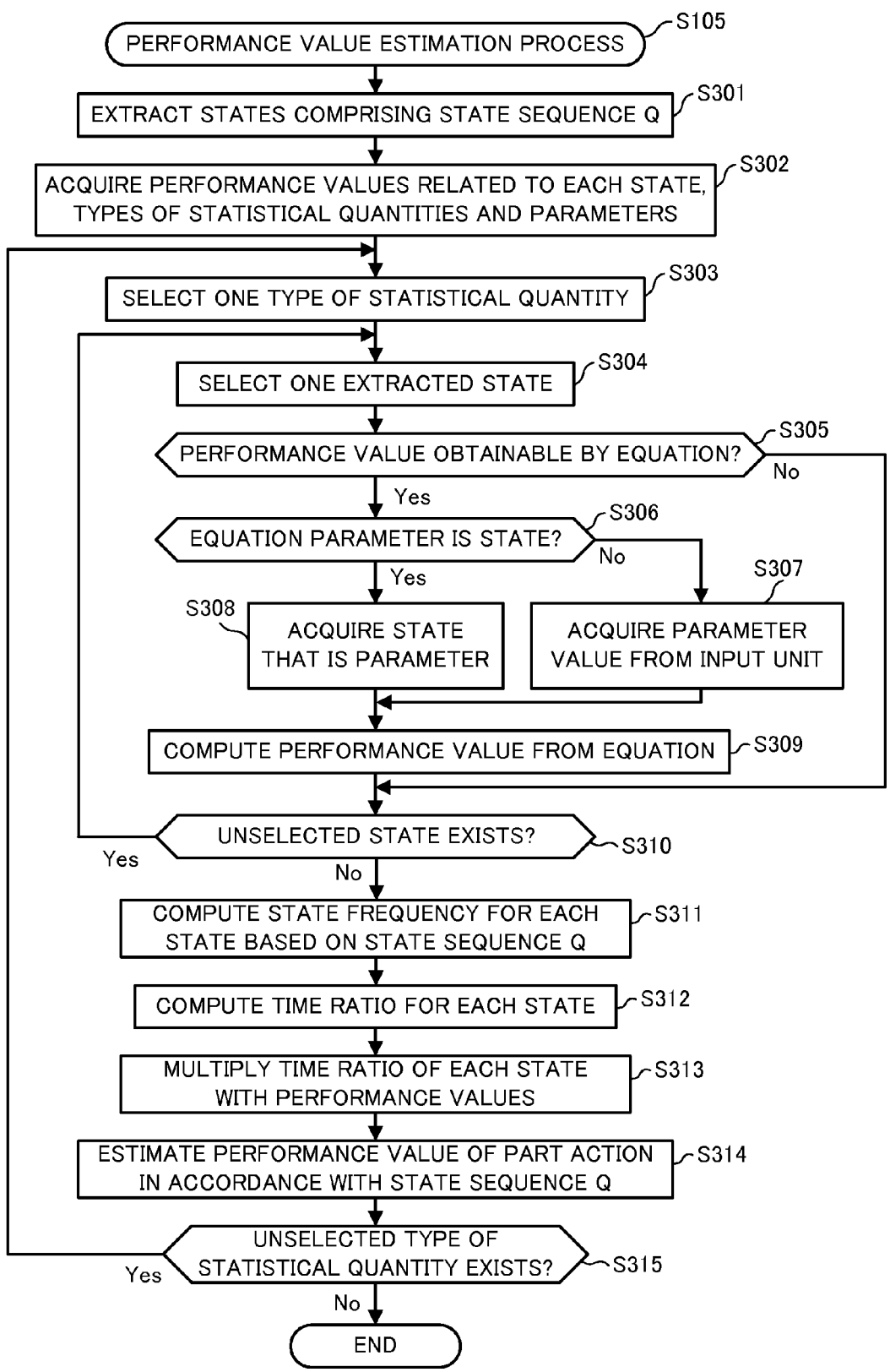
FIG. 11 is a flowchart showing a performance value estimation process.

Next, the calculator 25 executes a performance value estimation process (step S105). In this performance value estimation process, the performance value of the part P is estimated when the state of the part P changes in accordance with the state sequence Q. This performance value estimation process will be explained with reference to FIG. 11.

First, the calculator 25 extracts the states comprising the state sequence Q (step S301). For example, when the state sequence Q is the state sequence No. 1 shown in FIG. 10, the calculator 25 extracts the state St1A and the state St1B comprising the state sequence No. 1.

Next, the calculator 25 acquires from the performance value DB 21 performance values related to the various extracted states, the types of statistical quantities and the parameters (step S302). For example, from the "performance value data 1" shown in FIG. 5, the calculator 25 acquires information consisting of "2 mW", "maximum value" and "(parameters) none" related to the state St1A. Similarly, the calculator 25 acquires other performance values, types of statistical quantities and parameters relating to the state St1A. Furthermore, the calculator 25 acquires information relating to the state St1B, the same as the state St1A. The calculator 25 acquires the information shown in FIG. 12, for example, as the result of step S302.

Next, the calculator 25 selects one of the types of statistical quantities acquired in step S302 (step S303). For example, the calculator 25 selects "maximum value" shown in FIG. 12.

Next, the calculator 25 selects one of the states extracted in step S301 (step S304). For example, the calculator 25 selects the state St1A shown in FIG. 12.

Next, the calculator 25 determines whether or not the performance value is given by an equation (step S305). Specifically, the calculator 25 determines whether or not the performance value stipulated by the type selected in step S303 and the state selected in step S304, out of the performance values shown in FIG. 12, is given by an equation.

When it is determined that the performance value is not given by an equation (step S305: No), the calculator 25 moves the process to step S310.

When it is determined that the performance value is given by an equation (step S305: Yes), the calculator 25 determines whether or not the parameters of the equation are states (step S306).

When it is determined that the parameters of the equation are not states (step S306: No), the calculator 25 acquires the values of the parameters from the input unit 14 and/or the like (step S307). For example, the calculator 25 acquires parameters input by the user of the estimation device 10 by causing a screen for inputting parameters to be displayed on the output unit 15. Following this, the calculator 25 moves the process to step S309.

When it is determined that the parameters of the equation are states (step S306: Yes), the calculator 25 acquires the states that are parameters (step S308). For example, the calculator 25 acquires states contained in performance value data along with the equation.

Furthermore, the calculator 25 extracts the performance value in accordance with the equation, using the parameters (step S309).

Next, the calculator 25 determines whether or not there are any unselected states (step S310). Specifically, the calculator 25 determines whether or not there are any states not selected in step S304, out of the states extracted in step S301.

When it is determined that there is an unselected state (step S301: Yes), the calculator 25 repeats the process starting with step S304. In the second and subsequent steps S304, the calculator 25 selects one of the unselected states. Through this, the performance values of types selected in step S303 are all found, out of the performance values shown in FIG. 12.

Figure 13:
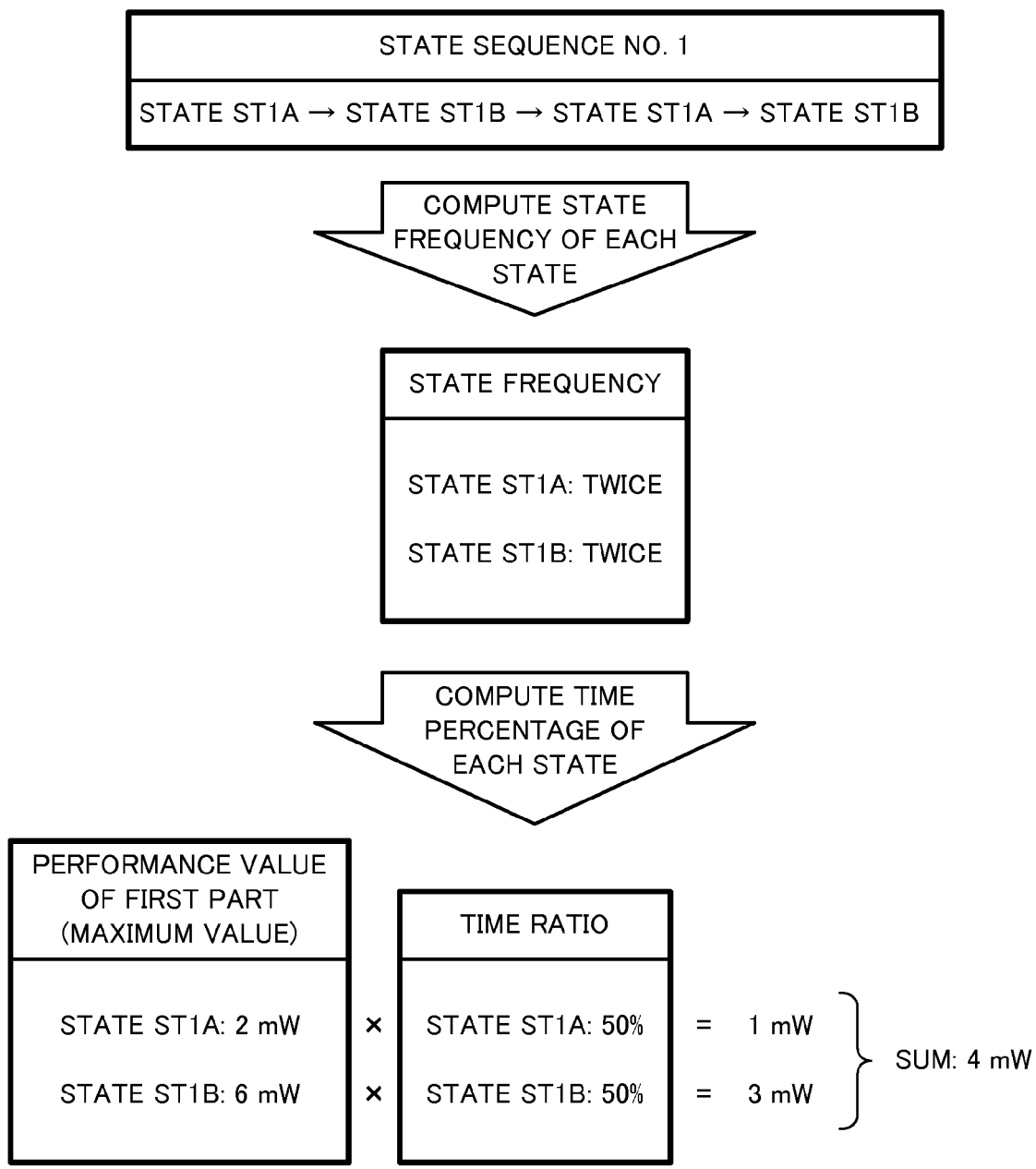
FIG. 13 is a schematic drawing for explaining computations in the performance value estimation process.

When it is determined that there are no unselected states (step S310: No), the calculator 25 extracts the state frequency of each state based on the state sequence Q (step S311). The state frequency means the number of each of the states comprising the state sequence Q. For example, as shown in FIG. 13, when the state sequence Q is the state sequence No. 1, the calculator 25 extracts two times as the state frequency for both the states St1A and St1B.

Next, the calculator 25 computes the time ratio of each state (step S312). The time ratio means the percentage of time the part P is in each state, per unit time. For example, in the case shown in FIG. 13, the calculator 25 calculates the time ratios of the states St1A and St1B as both being 50%.

Next, the calculator 25 multiplies the performance value and the time ratio of each state (step S313). For example, in the case shown in FIG. 13, the calculator 25 multiplies the performance value "2 mW" of the part P in the state St1A with the time ratio "50%" of the state St1A, computing a performance value of "1 mW". Similarly, the calculator multiplies the performance value and time ratio of the state St1B. Through this, the performance values of the part P in each state are computed.

Next, the calculator 25 estimates the performance value of the part P operating in accordance with the state sequence Q by computing the sum of the performance values (step S314).

For example, in the case shown in FIG. 13, the calculator 25 computes "4 mW" as the sum of the performance values of the first part X1 in the states St1A and St1B.

Next, the calculator 25 determines whether or not there is an unselected type of statistical quantity (step S315). Specifically, the calculator 25 determines whether or not any of the types obtained in step S302 have not been selected in step S303.

When it is determined that there is an unselected type of statistical quantity (step S315: Yes), the calculator 25 repeats the process starting with step S303. In step S303 from the second time on, the calculator selects one unselected type. Through this, the performance values of all types of statistical quantities of the part P operating in accordance with the state sequence Q are estimated. For example, when the state sequence Q is the state sequence No. 1, the performance values shown in table 41 of FIG. 14 are estimated.

When it is determined that there are no unselected types of statistical quantities (step S315: No), the calculator 25 concludes the performance value estimation process. The process of step S104 shown in FIG. 8 and the performance value estimation process of step S105 equate to processes executed by the performance value estimation unit 26.

In the following step S105, the calculator 25 determines whether or not there is an unselected state sequence (step S106). When it is determined that there is an unselected state sequence (step S106: Yes), the calculator 25 repeats the process beginning with step S104. In step S104 from the second time on, the calculator selects one unselected state sequence. Through this, the performance values of the part P operating in accordance with each of the state sequences generated by the state sequence generation process are computed. For example, when the part P is the first part X1, the values shown in the table group 42 of FIG. 14 are computed.

Next, the calculator 25 creates an overview of each state sequence and the estimated performance values (step S107). Specifically, the calculator 25 creates an overview by arranging the table group 42 of FIG. 14. At this time, the calculator 25 may again reference the condition DB 23 and may exclude from the overview performance values and state sequences that do not satisfy the conditions recorded in the condition DB 23.

Next, the calculator 25 extracts the optimum state sequence for the part P for each type of statistical quantity (step S108). Because the performance value according to this preferred embodiment is the magnitude of consumed power, the calculator 25 extracts the state sequence in which power consumption is a minimum, for each type of statistical quantity. Through this, for example as shown in FIG. 15, the optimum state sequence is extracted for each type of statistical quantity.

The processes in step S103 through S108 are equivalent to the processes executed by the optimum state sequence extraction unit 27.

Next, the calculator 25 determines whether or not there is an unselected part (step S109). Specifically, the calculator 25 determines the absence or presence of parts unselected in step S101, out of the parts comprising the target system X0. When it is determined that there is an unselected part (step S109: Yes), the calculator 25 repeats the process beginning with step S101. Furthermore, in this step S101 from the second time on, the calculator 25 selects one of the unselected parts.

In step S102, when it is determined that it is possible to obtain a state sequence from the simulator 50 (step S102: Yes), the calculator 25 executes a performance value computation process (step S110). This performance value computation process is the same process as that used in the state sequence acquired in step S102, in place of the state sequence Q in the performance value estimation process of step S105. Following this, the calculator 25 moves the process to step S109.

By repeating the processes of steps S101 to S110, the calculator 25 acquires information shown in the table 43 of FIG. 16, for example. The information shown in the sequence 44 of the table 43 is equivalent to that shown in FIG. 15. In addition, the state sequences of the third part X3 and the fourth part X4 are acquired by the calculator 25 from the simulator 50 for all types of statistical quantities.

Returning to FIG. 8, the calculator 25 computes the performance value of the target system X0 (step S111). Specifically, the calculator 25 computes the sum of the performance values of the first part X1 through the fourth part X4 for each type of statistical quantity as the performance value of the target system X0. Through this, the performance value shown in a sequence 45 of FIG. 16 is computed, for example. The calculator 25 may compute the performance values of the first unit X10 and the second unit X20 the same as the performance value of the target system X0. The computed performance values are output from the output unit 15. Then, the calculator 25 concludes the process.

As explained above, the calculator 25 generates the state sequence of parts whose actions are not simulated by the simulator 50 so as to satisfy the conditions contained in the condition data. Furthermore, the calculator 25 estimates the performance value of the part operating in accordance with the generated state sequence using the performance value data. Through this, the calculator 25 can accurately estimate the performance values of each part comprising the target system X0.

In addition, the calculator 25 computes the performance values for each type of statistical quantity. Accordingly, the calculator 25 can estimate the fluctuation amplitude of performance values caused by outside noise and/or the like, for example. Through this, it is possible for the estimation device 10 to show the user the accuracy of the estimated performance values.

In addition, the calculator 25 generates all state sequences with a possibility of being realized as the state sequences of the parts, and extracts the optimum of the generated state sequences. Through this, the user of the estimation device 10 can recognize the state sequence when the performance value is optimal, and can plan improvement of the performance value of the target system X0.

In addition, the estimation device 10 has a performance value DB management unit 22 and a condition DB management unit 24. Through this, the user of the estimation device 10 can arbitrarily correct and modify the data stored in the performance value DB 21 and the condition DB 23 using the performance value DB management unit 22 and the condition DB management unit 24.

In addition, the simulator 50 accomplishes simulations based on the performance value data stored in the performance value DB 21. Through this, the user of the estimation device 10 can execute simulations based on the newest performance value data stored in the performance value DB 21 without directly operating the simulator 50.

In addition, the user of the estimation device 10 can easily repeat simulations based on the results of the estimation device 10 and estimations of the performance value based on the actions of the simulator 50. Hence, the user can easily plan improvement in the performance value of the target system X0.

In addition, the constituent elements of the target system X0 have a layered structure. That is to say, the target system X0 is composed of two units and each unit includes multiple parts. Based solely on the actions of the simulator 50, it was difficult to estimate the performance values of the first part X1 and the second part X2 belonging to the bottom-most layer out of this layered structure. However, through the performance value estimation process according to this preferred embodiment, these performance values can be accurately estimated. Through this, the estimation device 10 can estimate the performance values of all of the first part X1 through fourth part X4 belonging to the same layer of the layered structure.

Second Preferred Embodiment

Next, a second preferred embodiment will be explained, centered on differences from the above-described first preferred embodiment. Compositions that are the same or similar to the above-described preferred embodiment use the same reference numbers and explanations of such are omitted or abbreviated.

Figure 17:
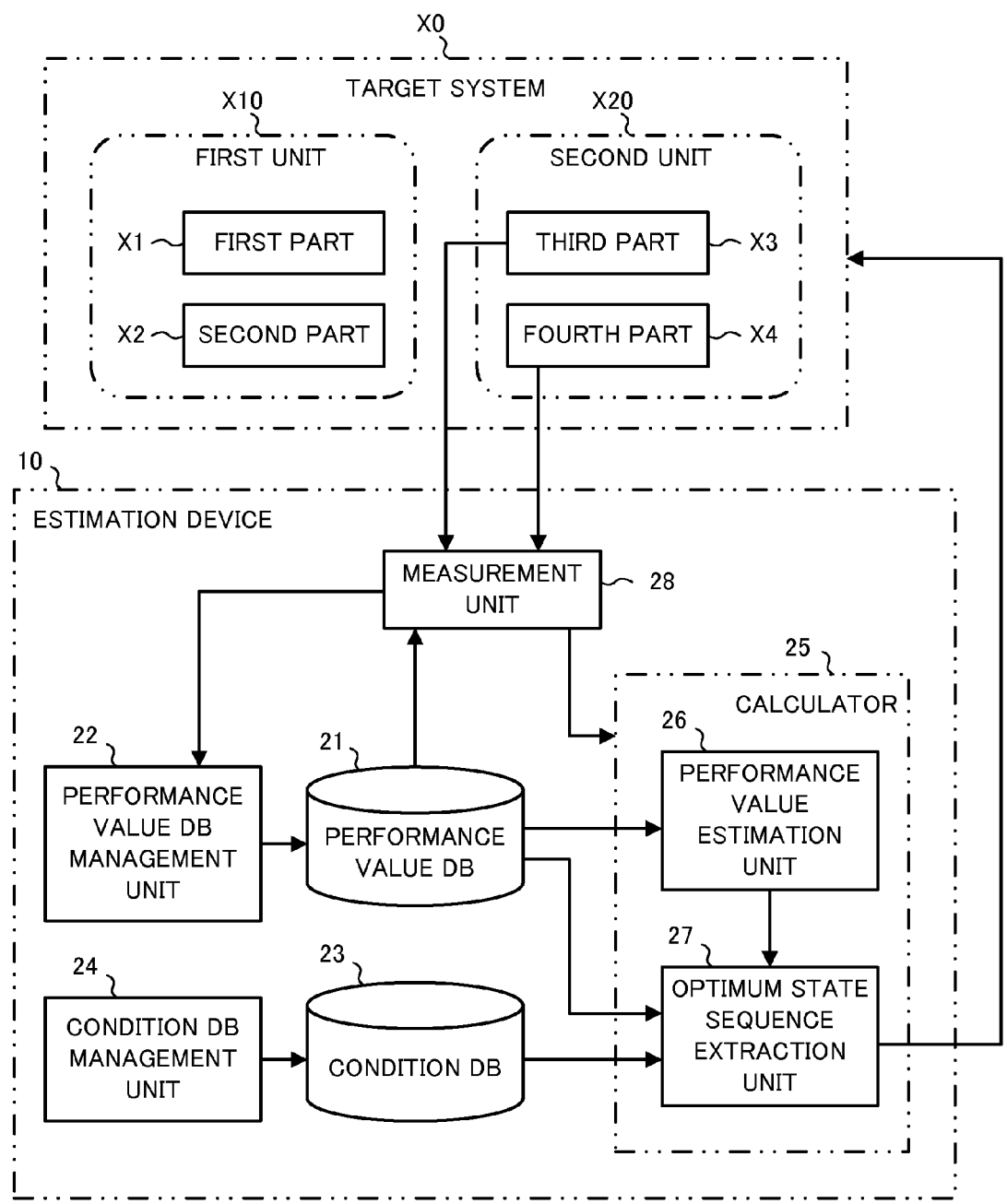
FIG. 17 is a drawing showing the composition of an estimation device according to a second preferred embodiment.

The estimation device 10 according to this preferred embodiment differs from that of the first preferred embodiment in having a measurement unit 28, as shown in FIG. 17. In addition, the estimation device 10 is connected to the target system X0 instead of the simulator 50.

The measurement unit 28 measures the performance values of the third part X3 and the fourth part X4 out of the parts comprising the target system X0, but does not measure the performance values of the first part X1 and the second part X2. The measurement unit 28 may also measure the performance values of the first unit X10, the second unit X20 and the target system X0. In addition, the measurement unit 28 may observe the states and state sequences of the first part X1 through the fourth part X4 other than the performance values and communicate such to the calculator 25.

In addition, the measurement unit 28 communicates specified information to the performance value DB management unit 22 when the measurement results of the performance values and the performance value data stored in the performance value DB 21 mutually differ. This information is information for reflecting the actions of the target system X0 in the performance value data stored in the performance value DB 21. The performance value DB management unit 22 corrects the performance value DB 21 in accordance with the communicated information.

For example, suppose performance value data indicating that the maximum value of the consumed power of the third part X3 in a state St3A is 10 mW is stored in the performance value DB 21. In this case, when the consumed power of the third part X3 in the state St3A is measured as 12 mW, the measurement unit 28 communicates to the performance value DB management unit 22 instructions for correcting the performance value of "10 mW" of the performance value data to "12 mW."

Figure 18:
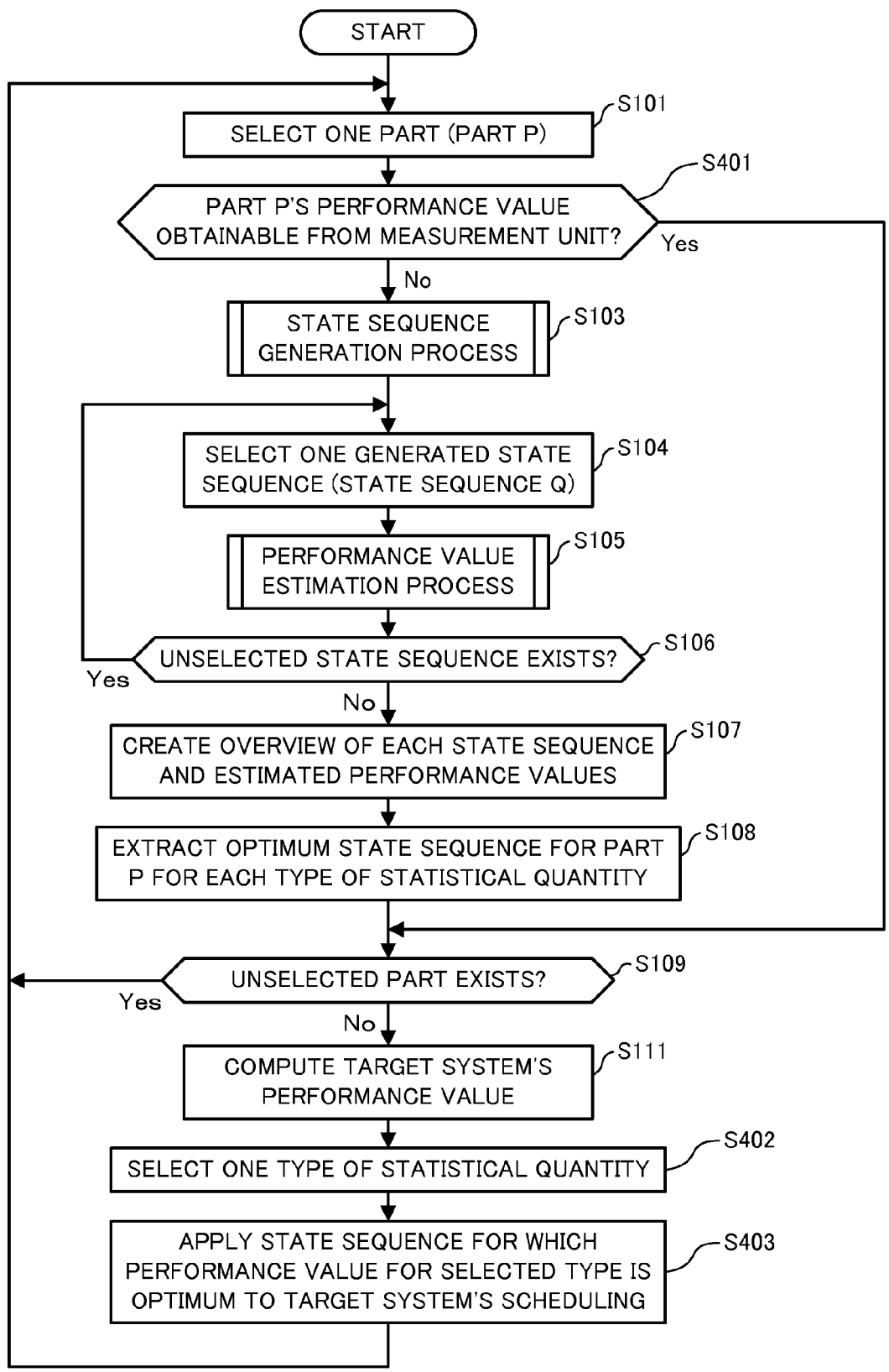
FIG. 18 is a flowchart showing a process executed by a calculator.

Next, the process executed by the calculator 25 in this preferred embodiment will be described with reference to FIG. 18.

First, the calculator 25 executes the same process as step S101 according to the first preferred embodiment. Then, the calculator 25 determines whether or not the performance value of the part P can be obtained from the measurement unit 28 (step S401). When it is determined that the state sequence cannot be obtained (step S401: No), the calculator 25 executes step S103. On the other hand, when it is determined that the state sequence can be obtained (step S401: Yes), the calculator 25 executes step S109.

In addition, when the overview of the state sequences and performance values is created in step S107, the calculator 25 omits from the overview the state sequences and performance values indicating the current state change of the target system X0.

In addition, following the process of step S111, the calculator 25 selects one of the types of statistical quantities (step S402). For example, the calculator 25 selects a type of statistical quantity input by the user of the estimation device 10.

Next, the calculator 25 applies the state sequence when the performance values of the selected type are optimal to the scheduling of the target system X0 (step S403). For example, when the values shown in FIG. 16 are computed in step S111 and the "maximum value" is selected in step S402, the calculator 25 applies the state sequences No. 1 and No. 21, respectively, to the scheduling of the first part X1 and the second part X2. Through this, the target system X0 acts in accordance with the optimum state sequence.

Furthermore, after step S403 the calculator 25 repeats the process beginning with step S101. By thus repeating, the calculator 25 executes the process beginning with step S101 each fixed time so as to not place a large burden on the main actions of the target system X0.

As explained above, the estimation device 10 according to this preferred embodiment estimates the performance values while measuring the power consumed by the target system X0 itself, in place of the simulator 50. Through this, the estimation device 10 can more accurately estimate the performance values than in the case of the first preferred embodiment.

In addition, the estimation device 10 applies the optimum state sequence to the actions of the target system X0. Through this, the estimation device 10 can swiftly execute improvements in the performance values of the target system X0.

Third Preferred Embodiment

Next, a third preferred embodiment will be explained, centered on differences from the above-described second preferred embodiment. Compositions that are the same or similar to the above-described preferred embodiment use the same reference numbers and explanations of such are omitted or abbreviated.

Figure 19:
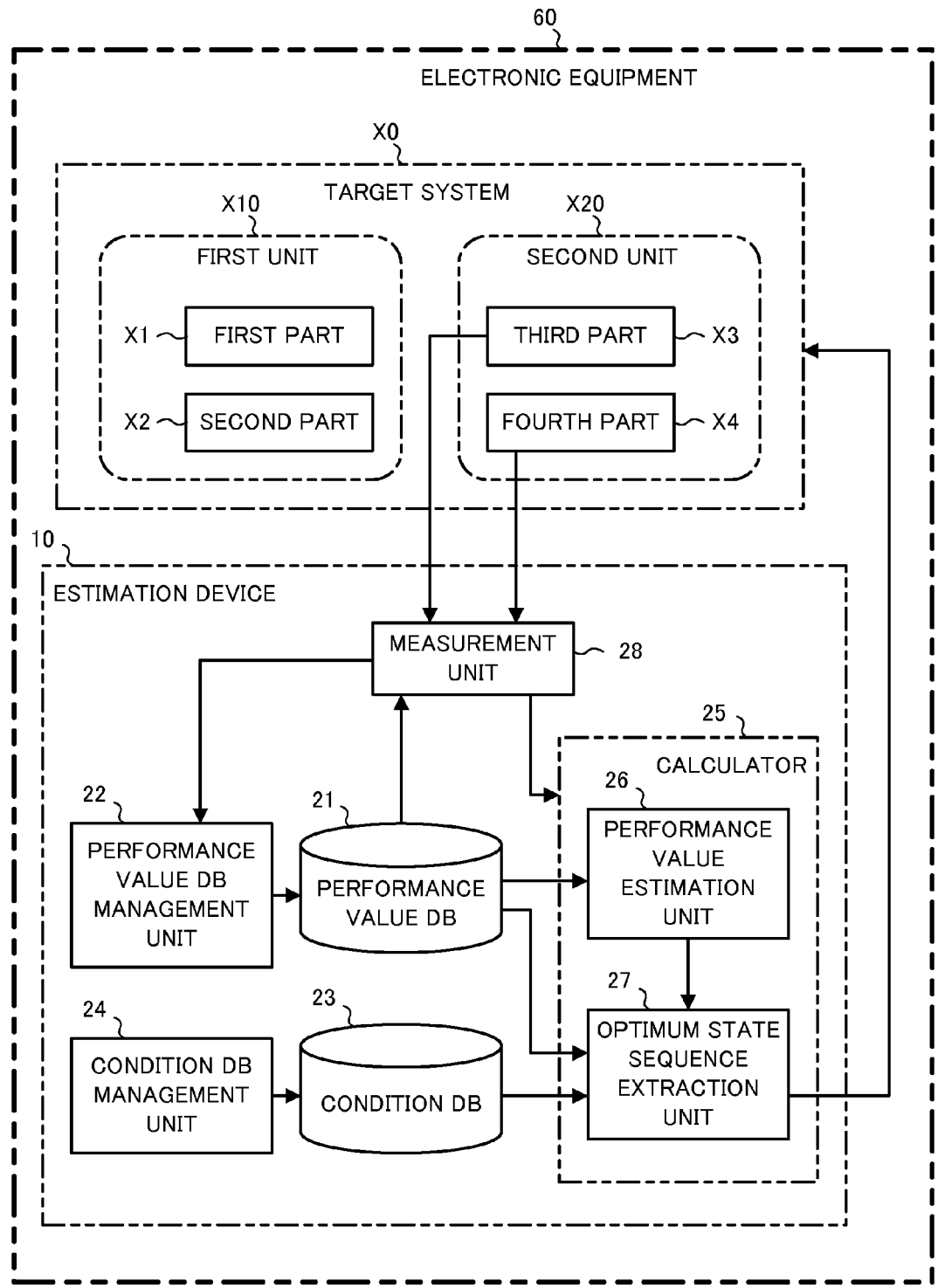
FIG. 19 is a drawing showing the composition of electronic device according to a third preferred embodiment.

The estimation device 10 and target system X0 according to this preferred embodiment are built into electronic device 60, as shown in FIG. 19.

By having the above-described composition, the electronic device 60 can cause the target system X0 to act in accordance with the optimum state sequence without being manipulated from the outside.

Other Preferred Embodiments

The preferred embodiments of the present invention were described above, but the present invention is not limited to the above-described preferred embodiments.

For example, it is possible to use a state change in place of the state according to the above-described preferred embodiments. For example, imagine a switch such that the ON state and the OFF state do not consume electric power but power is consumed when changing between the ON state and the OFF state. When this switch is contained in the target system X0, it is possible to compose an estimation device 10 the same as in the above-described preferred embodiments based on state change. In addition, it is possible to compose the estimation device 10 using both states and state changes.

In addition, in step S309 in the above-described preferred embodiment, the parameters of the equation are values or states obtained by the calculator 25 from the input unit 14. This is intended to be illustrative and not limiting, for it would be fine to have multiple equation parameters. In addition, as shown in the "mode value" of FIG. 12, the performance values of other types ("median value") may be used as parameters. In the case shown in FIG. 12, the recurring process from step S304 to step S310 is executed by the mode value being computed after the median value is first computed.

A field F16 of the performance value data according to the above-described preferred embodiments indicates the types of statistical quantities. These types of statistical quantities are not limited to the maximum value, the minimum value, the average value, the median value or the mode value. For example, quartiles, variance, kurtosis, skewing and/or the like may be used. In addition, the field F16 may show the distribution of the performance value such as the range or set and/or the like of the performance values.

In addition, with the above-described preferred embodiments the assumption was made that the composition of the target system X0 was simple, but this is intended to be illustrative and not limiting. For example, the estimation device 10 may estimate the performance values of multiple chips with which the first part X1 is provided, along with the performance values of the first part X1 through the fourth part X4.

In addition, it is possible to stipulate positional relationships among parts as a condition according to the above-described preferred embodiments.

In addition, the performance value data according to the above-described preferred embodiments is composed of seven fields, but this is intended to be illustrative and not limiting. For example, it would be fine to add to the performance value data fields indicating the units and numbers of parts, the absence or presence of notations of performance values in a data sheet, whether or not the performance values are measurement results, or the statistical process level.

In addition, it is possible to comprise the estimation device 10 even when the target system X0 and the parts are software and software modules. In this case, the power consumed by execution of the software and software modules is estimated.

In addition, the performance values according to the above-described preferred embodiments mean the magnitude of power consumed, but this is intended to be illustrative and not limiting. For example, it is possible to take the heat generated by the target system X0 and the various parts, or the execution time of the software modules as performance.

The performance of the estimation device 10 according to the above-described preferred embodiments can be realized even through specialized hardware or a regular computer system.

For example, the invention can comprise a device for executing the above-described processes by storing and distributing the program 18 stored in the auxiliary memory unit 13 on a computer-readable recording medium such as a flexible disk, a CD-ROM (Compact Disk Read-Only Memory), a DVD (Digital Versatile Disk), an MO (Magneto-Optical disk) and/or the like, and installing that program on a computer.

In addition, it would also be fine to store the program 18 on a disk device and/or the like possessed by a prescribed server device on a communication network such as the Internet and/or the like, and for example to download this onto a computer by overlaying such on carrier waves.

In addition, it is possible to achieve the above-described processes through start-up execution while transferring the program 18 via a communication network.

Furthermore, the above-described process can be achieved by executing all or a portion of the program 18 on a server device, and a computer executing the program 18 while sending and receiving information related to that process via a communication network.

In addition, when the above-described functions are realized by an OS (Operating System) apportioning such functions or when these functions are realized through cooperation between the OS and an application, it would be fine to store and distribute only the parts other than the OS on a medium and to download such onto a computer.

In addition, the means of realizing the functions of the processor 11 is not limited to software but all or a portion thereof may be realized by dedicated hardware (circuits and/or the like).

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

The consumed power estimation device, electronic device, consumed power estimation method and recording medium of the present invention are applicable to technology for reducing power consumption of electronic device and/or the like.

LEGEND

10 Estimation device
11 Processor
12 Main memory unit
13 Auxiliary memory unit
14 Input unit
15 Output unit
16 Interface
17 Internal bus
18 Program
21 Performance value DB
22 Performance value DB management unit
23 Condition DB
24 Condition DB management unit
25 Calculator
26 Performance value estimation unit
27 Optimum state sequence extraction unit
28 Measurement unit
41, 43 Tables
42 Table group
44, 45 Sequences
50 Simulator
60 Electronic device
F11, F12, F13, F14, F15, F16, F17, F21, F22, F23, F24, F25, F26 Field
X0 Target system
X1 First part
X2 Second part
X3, Y3 Third part
X4, Y4 Fourth part
X10 First unit
X20, Y20 Second unit
Y0 Virtual system
Y10 Virtual unit

What is claimed is:

1. A consumed power estimation device, comprising:
a consumed power memory for storing states of parts comprising a system and consumed power of the parts in these states;
a condition memory for storing conditions when the state of the parts changes;
a generator for generating state sequences into which the states are arrayed, in an order of change in accordance with the conditions stored in the condition memory, wherein the generator: specifies stored condition data related to a part among the parts comprising the system, enumerates all conditions contained in the specified stored condition data, and generates a state sequence satisfying all enumerated conditions;
a ratio computer for computing a percentage of time when the part is in the state per unit time, for each state comprising the state sequence; and
an estimator for finding products of percentages computed by the ratio computer and the consumed power stored in the consumed power memory, for each state comprising the state sequence, and estimating a sum of the products found as the consumed power of the part of the system.

2. The consumed power estimation device according to claim 1, wherein the consumed power memory stores at least one statistical quantity out of the maximum, minimum, average and mode of the consumed power of the part.

3. A consumed power estimation device, comprising:
a consumed power memory for storing states of parts comprising a system and consumed power of the parts in these states;
a condition memory for storing conditions when the state of the parts changes;
a generator for generating state sequences into which the states are arrayed, in an order of change in accordance with the conditions stored in the condition memory, wherein the generator: specifies stored condition data related to a part among the parts comprising the system, enumerates all conditions contained in the specified stored condition data, and generates a state sequence satisfying all enumerated conditions, and wherein the generator generates the state sequence when information indicating the consumed power of the part is not communicated from a measurer that measures the system;
a ratio computer for computing a percentage of time when the part is in the state per unit time, for each state comprising the state sequence; and
an estimator for finding products of percentages computed by the ratio computer and the consumed power stored in the consumed power memory, for each state comprising the state sequence, and estimating a sum of the products found as the consumed power of the part of the system.

4. The consumed power estimation device according to claim 3, further comprising an updater for updating the consumed power stored in the consumed power memory based on the consumed power of the part measured by the measurer.

5. An electronic device, comprising:
a system having parts in which states change; and
the consumed power estimation device of claim 3 for estimating the consumed power of the parts.

6. A consumed power estimation device comprising:
a consumed power memory for storing states of parts comprising a system and consumed power of the parts in these states;
a condition memory for storing conditions when the state of the parts changes;
a generator for generating state sequences into which the states are arrayed, in an order of change in accordance with the conditions stored in the condition memory, wherein the generator generates multiple state sequences, and wherein, for each generated state sequence, the generator generates a state sequence for a part among the parts of the system by: specifying condition data related to the part, enumerating all conditions contained in the stored condition data, and generating the state sequence satisfying all enumerated conditions;

a ratio computer for computing a percentage of time when the part is in the state per unit time, for each state comprising the state sequence, wherein the ratio computer computes the percentage for each sequence comprising the multiple state sequences;

an estimator for finding products of percentages computed by the ratio computer and the consumed power stored in the consumed power memory, for each state comprising the state sequence, and estimating a sum of the products found as the consumed power of the part of the system, wherein the estimator estimates the consumed power of the part for each state sequence; and an extractor for extracting the state sequences, wherein the extractor extracts the state sequence in which the consumed power estimated by the estimator is a minimum, out of the multiple state sequences.

7. The consumed power estimation device according to claim 6, further comprising an applicator for applying the state sequence extracted by the extractor to action of the system.

8. A consumed power estimation method, comprising:

a generation step for generating state sequences into which the states of parts of a system are arrayed, in an order of change in accordance with prescribed conditions, wherein the generation step comprises: specifying stored condition data related to a part among the parts comprising the system, enumerating all conditions contained in the specified stored condition data, and generating a state sequence satisfying all enumerated conditions;

a ratio computation step for computing a percentage of time when the part is in the states per unit time, for each state comprising the state sequence; and an estimation step for finding products of the percentages computed by the ratio computation step and the consumed power of the parts in the state, for each state comprising the state sequence, and estimating a sum of the products found as the consumed power of the part of the system.

9. A non-transitory computer-readable recording medium on which is recorded a program for causing a computer to execute:

a procedure for storing states of parts comprising a system and consumed power of the parts in those states;

a procedure for storing conditions when the state of the parts changes;

a procedure for generating state sequences into which the states are arrayed, in an order of change in accordance with the conditions, the procedure comprising: specifying stored condition data related to a part among the parts comprising the system, enumerating all conditions contained in the specified stored condition data, and generating a state sequence satisfying all enumerated conditions;

a procedure for computing a percentage of time when the part is in the state per unit time, for each state comprising the state sequence; and a procedure for finding products of the computed percentages and the consumed power stored, for each state comprising the state sequence, and estimating a sum of the products found as the consumed power of the part of the system.

10. A consumed power estimation method, comprising:

a generation step for generating state sequences into which the states of parts of a system are arrayed, in an order of change in accordance with prescribed conditions, comprises: specifying stored condition data related to a part among the parts comprising the system, enumerating all conditions contained in the specified stored condition data, and generating a state sequence satisfying all enumerated conditions, wherein the generation step occurs when information indicating the consumed power of a part is not communicated from a measurer that measures the system;

a ratio computation step for computing a percentage of time when the part is in the states per unit time, for each state comprising the state sequence; and an estimation step for finding products of the percentages computed by the ratio computation step and the consumed power of the parts in the state, for each state comprising the state sequence, and estimating a sum of the products found as the consumed power of the part of the system.

11. A consumed power estimation method, comprising:

a generation step for generating state sequences into which the states of parts of a system are arrayed, in an order of change in accordance with prescribed conditions, wherein the generation step generates multiple state sequences, and wherein, for each generated state sequence, a state sequence for a part among the parts comprising the system is generated by: specifying condition data related to the part, enumerating all conditions contained in the specified stored condition data, and generating the state sequence satisfying all enumerated conditions;

a ratio computation step for computing a percentage of time when the part is in the states per unit time, for each state comprising the state sequence, wherein the ratio computation step computes the percentage for each sequence comprising the multiple state sequences;

an estimation step for finding products of the percentages computed by the ratio computation step and the consumed power of the part in the state, for each state comprising the state sequence, and estimating a sum of the products found as the consumed power of the part of the system, wherein the estimation step estimates consumed power of the part of the system for each state sequence; and an extraction step for extracting the state sequences, wherein the extraction step extracts the state sequence in which the consumed power estimated by the estimator is a minimum out of the multiple state sequences.

12. A non-transitory computer-readable recording medium on which is recorded a program for causing a computer to execute:

a procedure for storing states of parts comprising a system and consumed power of the parts in those states;

a procedure for storing conditions when the state of the parts changes;

a procedure for generating state sequences into which the states are arrayed, in an order of change in accordance with the conditions, the procedure comprising: specifying stored condition data related to a part among the parts comprising the system, enumerating all conditions contained in the specified stored condition data, and generating a state sequence satisfying all enumerated conditions, wherein the procedure for generating the state sequence is performed when information indicating the consumed power of a part of the system is not communicated from a measurer that measures the system;

a procedure for computing a percentage of time when the part is in the state per unit time, for each state comprising the state sequence; and a procedure for finding products of the computed percentages and the consumed power stored, for each state comprising the state sequence, and estimating a sum of the products found as the consumed power of the part of the system.

13. A non-transitory computer-readable recording medium on which is recorded a program for causing a computer to execute:

a procedure for storing states of parts comprising a system and consumed power of the parts in those states;

a procedure for storing conditions when the state of the parts changes;

a procedure for generating state sequences into which the states are arrayed, in the order of change in accordance with the conditions, wherein the procedure for generating state sequences generates multiple state sequences, and wherein, for each generated state sequence, a state sequence for a part among the parts comprising the system is generated by: specifying condition data related to the part, enumerating all conditions contained in the specified stored condition data, and generating the state sequence satisfying all enumerated conditions;

a procedure for computing a percentage of time when the part is in the state per unit time, for each state comprising the state sequence, wherein the procedure for computing a percentage computes the percentage for each sequence comprising the multiple state sequences;

a procedure for finding products of the computed percentages and the consumed power stored, for each state comprising the state sequence, and estimating a sum of the products found as the consumed power of the part of the system, wherein the procedure for finding products and estimating a sum estimates the consumed power of the part of the system for each state sequence; and a procedure for extracting the state sequence, wherein the extractor extracts the state sequence in which the consumed power estimated by the estimator is a minimum, out of the multiple state sequences.

\* \* \* \* \*